Nov. 24, 1931.  H. DEVLIN  1,832,895
DOUGHPROOFER
Filed June 4, 1927
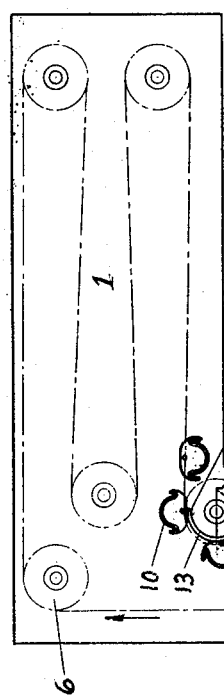
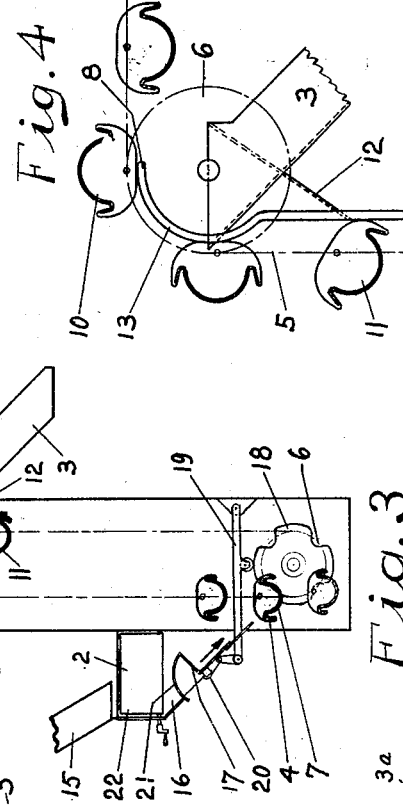
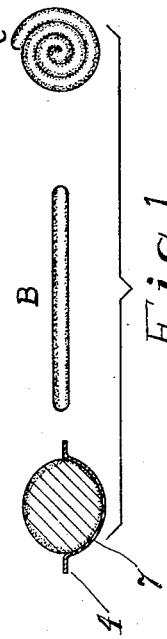
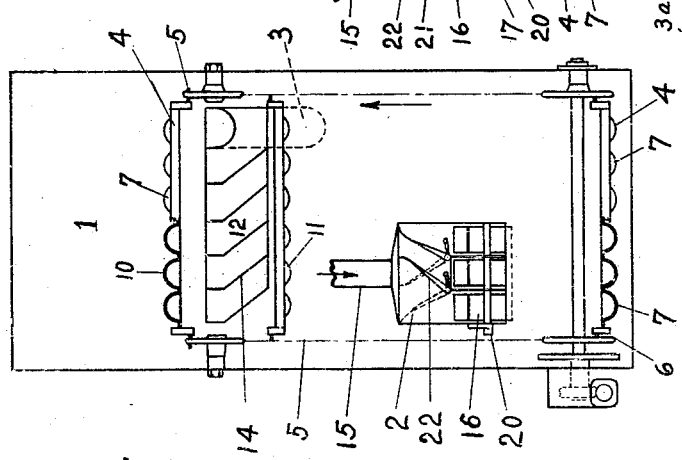
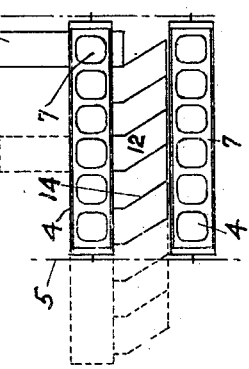
INVENTOR
Henry Devlin
BY George P. Willcox
ATTORNEY Patented Nov. 24, 1931

1,832,895

UNITED STATES PATENT OFFICE

HENRY DEVLIN, OF SAGINAW, MICHIGAN, ASSIGNOR TO BAKER PERKINS COMPANY, INC., OF SAGINAW, MICHIGAN, A CORPORATION OF NEW YORK

DOUGHPROOFER

Application filed June 4, 1927. Serial No. 196,576.

This invention relates to certain improvements in the arrangement, mode of operation and construction of dough proofers of the continuous, multiple pass traveling pocket type that work by first arranging dough pieces side by side in rows and then passing the rows slowly and consecutively in close order through a proofing chamber.

An object of this invention is to improve such proofers by providing automatic means for turning the individual dough pieces upside down, or at all events into new positions, in the pockets during their passage, the purpose being to completely expose the surfaces of the dough pieces in order that they may develop uniform surface texture.

Dough pieces that have been turned in the pockets while passing through the proofing chamber will, after having been sheeted and curled, bake into loaves that are of practically uniform cross sectional texture, free from spiral streaks. Such streaks sometimes result from uneven thickness and texture of the incipient crust, and are acquired in the proofing chamber from lack of turning. Sometimes hard spots occur in the dough pieces due to pellets of excess dusting flour used to keep the dough from sticking in the tray pockets if they are not turned.

The automatic turning means of this invention is believed to be the first satisfactory embodiment of the dough-inverting idea as applied to traveling tray proofers of the multiple dough-pocket type employing a single proofing conveyor.

The invention combines with the automatic dough-inverting feature above mentioned a further development, namely, means by which the dough pieces, when being turned, are also advanced step-by-step, from pocket to pocket of the respective trays. The result is that each dough piece is made to travel from, say, the left-hand side of the proofing chamber toward the right, advancing the distance of one pocket as each circuit of the proofer is completed, and finally discharging when proofing is finished.

The inverting and sidewise transferring device, in its preferred form, operates according to the following method:

Each dough piece, upon leaving a pocket of a given tray, turns over and deposits itself in a pocket of a different tray in sidewise offset relation to the first pocket, and then makes another circuit of the proofing chamber. The operation is repeated for each pocket until the final or end pocket of a tray is reached. Thence the proofed piece falls into a chute that starts it on its way to the sheeter.

The invention further imparts to a proofer having the novel inverting and transferring features above described, the capability of altering the proofing period while maintaining uniform speed of travel of the tray conveyor, and also keeping the trays timed accurately with the divider that supplies dough pieces to be proofed.

Preferably the proofing time is varied by a new loading device that deposits dough pieces consecutively in the first, say, left-hand tray pockets, or even into the second or third or any other pockets, depending upon the desired length of proofing time. Thus, for a given rate of supply from the divider, as thirty dough pieces per minute, if the feed is to the first or left-hand pockets of the proofer trays, full proofing time, say, twenty minutes will be given each loaf that enters the proofer. If the loader is set to deliver into the next adjacent pocket the proofing time be cut down accordingly although the rates of feed and tray-travel remain constant and correctly timed with the operations of the divider. This selective loader enables any suitable reduction in proofing time to be made without employing speed-change mechanisms or installing a special pocket loading machine ahead of the proofer, or employing any special timing device at the discharge end of the proofer to prevent loaf-doubling on the discharge conveyor.

With the foregoing and certain other objects in view, which will appear later in the specifications, the invention comprises the devices described and claimed and the equivalents thereof.

In the drawings Fig. 1 is a diagrammatic view of a dough piece in a tray pocket, also showing the dough piece sheeted and curled.

Fig. 2 is a front view, partly in section, of a proofer embodying my invention, the front wall casing removed.

Fig. 3 is a side view of the parts shown in Fig. 2.

Fig. 4 is an enlarged side view of the trays of the dumping station.

Fig. 5 is a diagrammatic plan view of a modified arrangement of the discharge spouts.

As shown in the drawings, a proofer of the kind to which this invention is adapted consists in a proofing chamber 1, to which material is supplied by a loader 2 and from which the proofed material discharges through a spout 3. The proofing chamber is fitted with the usual temperature and humidity controlling devices, not shown, and the dough pieces are circulated through the chamber on trays 4 that are mounted on sprocket chains 5, 5 that ride on sprocket wheels 6. Each tray 4 has a number of places or seats for dough pieces, such as, preferably, pockets 7. In the illustration, Fig. 2, six pockets are shown for each tray. The trays travel from the loader up to the top of the proofing chamber 1, through it by a series of superimposed passes, and thence down again to the loader.

According to this invention the trays are tiltably mounted on the chains 5, 5, and when they reach any predetermined place in their path of travel, as for example, the vicinity of the discharge spout 3 they are tilted in succession, while maintaining their normal rate of travel. For automatically tilting the trays at such point, a projection 8 termed a dumping bracket fixed to the frame of the proofing chamber, is encountered by the moving tray. The tray turns completely over into the position shown at 10, where it commences its downward travel, and further down at 11 it resumes an approximately upright position. Here the tray registers with the floor 12 of a transfer chute, so that a number of dough pieces simultaneously dumped from the several pockets of a tray at position 10 fall upon the chute floor 12 and land in the pockets of the second tray ahead, which is in position 11.

The tilting and straightening-up movements of the tray are controlled by shaped guide-ways 13.

If it were left free to travel straight down the chute floor 12, a dough piece dumped from any pocket, at 10 in Fig. 2, would normally land in the alined pocket of a preceding tray, in position indicated at 11, but for the purpose of this invention it is made to fall into a relatively offset pocket of the lower tray. That is to say, a dough piece discharged from the left-hand pocket of a tray will land, inverted, or in a different position, in the next to the left-hand pocket of the second tray ahead. For that purpose the side walls 14 of the transfer chutes are inclined downward to the right, all except the chute which receives the dough pieces from the right-hand end pocket of the tray, being discharge spout 3.

A given dough piece traverses the circuit of the proofing chamber as many times as there are pockets 7 in the trays, and at the completion of each circuit it is turned upside down or nearly so and is delivered into the next pocket of the second tray ahead. At the completion of its final circuit it is delivered into the spout 3 and goes to the sheeter, where it is rolled out flat, as at B, Fig. 1, then is curled into a loaf, as at C, and thence to the baking oven.

In its simplest form the loading device consists in a chute 15 for supplying dough pieces from the divider and delivering them into a spout 16 which is in the line of travel of the first pocket of each tray. The spout has a feed timing gate 17, which works in synchronism with the arrival of the successive trays 4. Means is shown in Fig. 3 for actuating gate 17, where 18 is a cam revolvable with sprocket 6, and 19 is a cam-actuated lever operatively connected to a pintle 20 of the gate 17. The gate itself has the form of a trough, a wall of which has a curved guard plate 21 that rises in the chute 16 when the gate delivers a dough piece to tray 4, thereby preventing the next following dough piece from doubling.

There are two ways in which the proofing time can be changed without altering the rate per minute of feeding into the proofer. One way is shown in Figs. 2 and 3, employing more than one, preferably three, loader spouts 16. Between the tops of these spouts and the bottom of chute 15 are deflecting baffles 22 independently adjustable by hand to various positions, as indicated by dotted lines in Fig. 2, to direct the dough pieces from chute 15 into any one of the three left-hand tray pockets. As an example of the use of these loader spouts and deflecting baffles, if the normal proofing time is, say, fifteen minutes, the feed will be through the left-hand loader spout 16. If the proofing period is to be cut to twelve and a half minutes the feed will be through the central spout, and if ten minute proofing is desired, the feed is directed through the right-hand spout.

Another way of changing the proofing time is shown diagrammatically in Fig. 5. In this arrangement the discharge spout 3a is made integral with the laterally directed chutes 12, 14, and the entire system of chutes is capable of being placed as shown in full lines, so discharge spout 3a will deliver from the right-hand pocket 7 of tray 4, or when desired to discharge the piece earlier and thereby shorten the proofing time, the spouts can all be moved to the left, as shown by dotted lines. In that case one of the intermediate pockets of the tray will discharge into spout 3a.

Either of the arrangements described cuts down the proofing time by reducing the total number of circuits the dough piece makes through the proofing chamber. The circuits that are eliminated may be either those at the beginning of the series, or they may be at the end of the series without departing from the invention as herein described and claimed.

By the means above described there is conferred upon the usual traveling tray proofer a new capacity for automatically turning each dough piece several times during the proofing period, and thereby making it possible to considerably reduce, or entirely eliminate the use of dusting flour in the tray pockets, as distinguished from pocket tray proofers in which the dough is not turned. The feed into the proofer and the delivery from it can be permanently synchronized with the operation of the divider preventing the forming of doubles. Without any speed-change apparatus or other extra mechanism I have imparted to the tray proofer the new ability to vary the proofing time within any reasonable operating limits without varying the speed of tray travel. Moreover, the entire construction is simple, durable and not likely to get out of order.

Having thus described my invention, what I claim and desire to secure by Letters Patent is:

1. A multiple pocket traveling tray proofer having tiltable trays, a loader adapted to deliver a loaf into a pocket of each tray in succession, means for tilting the trays in succession while maintaining their normal rate of travel, chutes arranged to receive loaves from certain pockets of a tray when tilted and deliver them, in a turned position, into certain relatively offset pockets of another tray, and a chute arranged to discharge a loaf from a pocket of each tray when tilted.

2. A multiple pocket traveling tray proofer having tiltable trays, a loader adapted to deliver a loaf into any one of several optionally selected pockets of each tray in succession, means for tilting the trays in succession, chutes arranged to receive loaves from certain pockets of each tray when tilted, and deliver them, inverted, into certain relatively offset pockets of another preceding tray, and a chute arranged to discharge a loaf from the end pocket of each tray when tilted.

3. A proofing chamber having a unitary traveling tray conveyor including a horizontal and a downward run, wheels carrying said runs, tray-tilting means stationed in the path of said horizontal run, dough-piece chutes extending from said horizontal run beneath its tray-tilting station to the downward run at a place below said wheels, the receiving and delivery ends of said chutes positioned in laterally offset relation, for the purposes set forth.

4. A proofing chamber having traveling trays, a loader arranged to supply dough-piece to each tray in succession at a predetermined place thereon, a tray inverter, a dough-piece transfer chute having its upper end positioned beneath a run of trays and having its lower end arranged to discharge upon a relatively offset place on a preceding tray during the passage of the material through the proofer, a delivery spout also positioned beneath said run, the loader including movable baffles adjustable in a direction crosswise the proofing chamber whereby the number of circuits traversed by the loaf in its passage through the proofer is varied, for proportionally altering the duration of the proofing period.

5. In a proofer having a single conveyor, a plurality of traveling trays thereon, a plurality of pockets in each tray, guideways for engaging, inverting and righting each tray in order, chutes arranged to transfer dough-pieces from the several pockets of the inverted tray into predetermined relatively offset pockets of a righted tray on the same conveyor during the continuous passage of the trays and material through the proofer.

6. In a proofer, a single tray conveyor including runs traveling at an angle to each other, each tray of said conveyor having a plurality of pockets, means for tilting each tray in succession at a predetermined place in a run, guide chutes arranged beneath the place of tilting and adapted to catch all dough pieces spilled from the pockets of a tilted tray, said chutes directed downwardly and laterally to transfer the dough pieces into certain relatively offset pockets of the second tray ahead in an angularly disposed run of the same conveyor, during the continuous passage of the trays through the proofer.

7. In a proofer, tiltable pocketed traveling trays for carrying dough pieces, trippers located in the path of said trays to invert the same, chutes positioned to catch and discharge said dough pieces in inverted position into certain predetermined pockets of another tray, said last mentioned pockets located in laterally offset relation to the pockets from which the dough pieces were released, chains connecting all of said trays operatively together and constituting a single conveyor, for the purposes set forth.

8. A loader for a pocketed-tray proofer comprising a chute for supplying dough pieces to said loader, spouts in said loader each positioned to register with one of the pockets of each tray in succession, a feed gate for each spout, means associated with said trays for actuating said gates and movable deflector baffles between said chute and said spouts, for the purpose set forth.

9. A loading device for a pocketed traveling tray proofer comprising a chute for delivering dough pieces to said loading device, three delivery spouts arranged side by side, each positioned to successively register with certain of the pockets of the trays, a delivery-timing gate for each spout, a cam-actuated lever associated with said trays and adapted to actuate said gates in synchronism therewith, and independently adjustable deflecting baffles between said chute and said delivery spouts, whereby to direct dough pieces at will into any one of said certain tray pockets, for the purposes set forth.

10. In a proofer, a multiple pocket traveling tray conveyor having tiltable trays, a loader adapted to deliver a loaf into a pocket of each tray in succession, a tray-dumping bracket, and tray-righting guideways arranged in the path of the trays, transfer chutes positioned to receive loaves from certain pockets of a tray when tilted, said chutes inclined laterally and located to deliver loaves in a turned position into certain relatively offset pockets of a tray preceding, and a discharge spout positioned to receive a loaf from an end pocket of each tray when tilted and to discharge it from the proofer.

11. A multiple pocket traveling tray proofer having tiltable trays, a loader arranged to deliver a loaf into any one of several optionally selected pockets of each tray in succession, means for tilting the trays in succession, chutes arranged to receive loaves from certain pockets of each tray when tilted, and to deliver them, inverted, into certain relatively offset pockets of another preceding tray, and a spout arranged to receive the end loaf of each tray when tilted, and to divert it out from the proofer.

12. In a multiple pocket traveling tray proofer having an endless series of tiltable trays, means for tilting the trays in succession while maintaining their normal rate of travel, chutes arranged to receive loaves from certain pockets of a tray when tilted and deliver them, in a turned position, into certain relatively offset pockets of another tray of the same series.

In testimony whereof, I affix my signature.

HENRY DEVLIN.